United States Patent Office 3,284,688
Patented Nov. 8, 1966

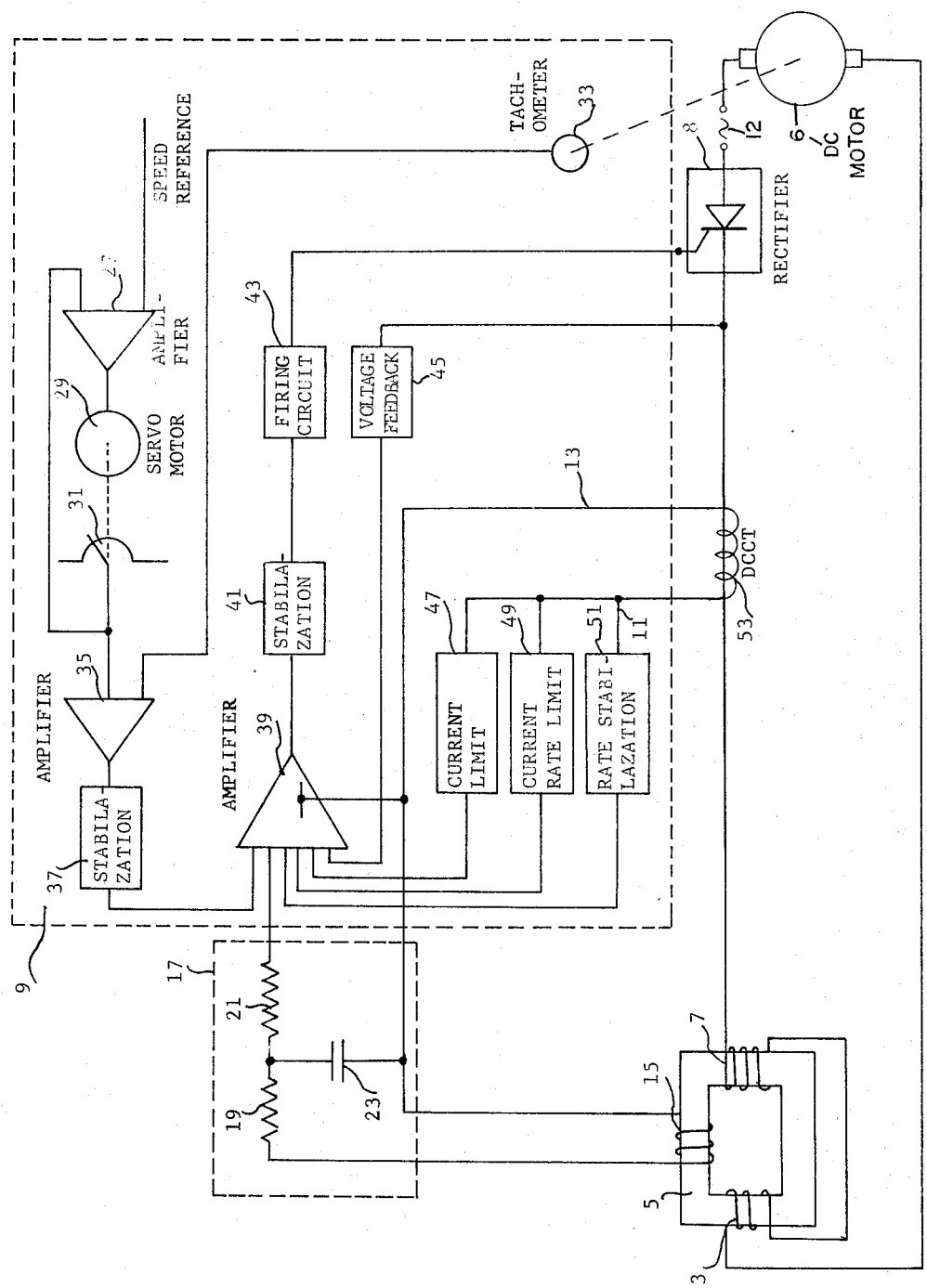

3,284,688
D.-C. CURRENT REGULATOR INCLUDING A HIGH GAIN SATURATING AMPLIFIER
Kenneth G. Black, Scotia, N.Y., assignor to General Electric Company, a corporation of New York
Continuation of application Ser. No. 149,701, Nov. 2, 1961. This application July 27, 1965, Ser. No. 475,091
3 Claims. (Cl. 318—332)

This invention relates to regulators for controlling D.-C. power furnished by rectifiers and more particularly to apparatus for producing a stabilizing signal for a D.-C. current regulator, and this application being a continuation of copending application Serial No. 149,701 filed November 2, 1961, and now abandoned.

In regulators for controlling the D.-C. power furnished by rectifiers and particularly in D.-C. speed regulators a signal obtained from the rectifier current is used for stabilization of the regulator. This stabilizing signal may be proportional to the rectifier current, or to the rate of change of rectifier current, or to a combination thereof. The required magnitude of this signal is a function of the inductance of the armature circuit.

In rectifier supply systems in which the load is counter E.M.F. with low inductance, the current flows in pulses at low average values of current, instead of being continuous. This has a degrading effect on the system. In order to provide sufficient inductance at low current levels a saturating reactor is connected in the armature circuit. When such a saturating reactor is used the stabilizing signal is not strong enough at low values of current. The magnitude of the stabilizing signal should be stronger at the low value of currents. The magnitude of the stabilizing signal should also be a direct function of the inductance of the armature current.

It is therefore an object of this invention to provide a new device for providing a strong stabilizing signal at low values of current for a D.-C. regulator using a saturating reactor.

Another object of this invention is to provide a new and improved device for providing a strong stabilizing signal proportional to the rate of change of rectifier current at low values of current.

Yet another object of this invention is to provide a new and improved device for providing a stabilizing signal proportional to the inductance of the armature circuit at all times.

In accordance with the principles of this invention a strong stabilizing signal for a regulator using a saturating reactor is obtained at the low values of current from a D.-C. rectifier power source.

A signal from a winding around the core of the saturating reactor is applied to the regulating circuit for stabilization. Such a signal is proportional to the rate of change of the rectifier current at low values of current when the saturating reactor is unsaturated and as the current increases and saturates the saturating reactor the signal becomes zero. The magnitude of the stabilizing signal also changes as the inductance of the reactor changes to provide the proper stabilizing signal.

The novel features of the invention are set forth with particularity in the appended claims. The invention itself, however, both as to its organization and method of operation, together with further objects and advantages thereof, may best be understood by referring to the following description and the accompanying drawing.

The drawing shows a schematic of a circuit embodying the principles of this invention.

Referring now to the drawing, the windings 3 and 7 of saturating reactor 5 are connected into the load circuit of the rectifier 8 and the D.-C. current flows through these windings. An A.-C. current source 12 is connected between the rectifier 8 and a D.-C. motor 6. Speed regulator circuit 9 is a standard speed regulator circuit for controlling the D.-C. current from the rectifier to the load which is the armature of the D.-C. motor 6. The signal applied to the speed regulator circuit 9 on lines 11 and 13 is a stabilizing signal proportional to rectifier current, or rate of change of rectifier current, or to a combination thereof. At low values of current, or to a combination thereof. At low values of current, however, this signal is not strong enough for good stabilization, and is not a direct function of the inductance of reactor 5.

Saturating reactor 5 is included in the armature circuit to provide sufficient inductance at low current levels to maintain a continuous current flow. Otherwise the current would flow in pulses at low average values of current.

Winding 15 wound around the core of saturating reactor 5 produces a voltage when the reactor is unsaturated which is proportional to the rate of change of the rectifier current through the reactor. This voltage signal is applied through a time lag network 17 to the speed regulator circuit 9 for stabilization at low values of current. As the rectifier current increases the reactor 5 becomes saturated and the voltage from winding 15 becomes zero. As the current becomes greater, however, the signal applied in lines 11 and 13 is sufficient for stabilization. The inductance of the armature circuit changes from a high value to a low value, the low value being the inductance of the motor as the armature current increases. This change of inductance is due to the saturation of the reactor. However, the change of inductance is not a sharp change. The stabilizing signal derived from winding 15 is proportional to the reactor inductance at all times and is of the proper magnitude. The magnitude of the signal from winding 15 is:

$$M = K \cdot pI \cdot E$$

where $M$ = magnitude of signal from winding 15
$K$ = proportionality constant
$pI$ = rate of change of armature current
$E$ = reactor inductance The signal from winding 15 is inherently of the proper signal magnitude as it corresponds to the inductance of the reactor.

The time lag network 17 is composed of resistors 19 and 21 and capacitor 23, and converts the rate of change signal to what is effectively a current signal to stabilize the speed regulator circuit. The stabilizing signal as determined by the time lag circuit 17 is as follows:

$$\text{Stabilizing signal} = \frac{K}{1+T} pR$$

where $pR$ = the rate of change of rectifier current
$K$ = proportionality constant
$T$ = time constant of time lag circuit.

The speed regulator circuit 9 is a speed regulator circuit known in the industry. The specific speed regulator circuit was described in a conference paper entitled: "Analytical Approach to Design of Speed Regulator for Hot Strip Mill," presented by K. G. Black at the AIEE Winter General Meeting, New York, N.Y., January 29 to February 3, 1961.

In the speed regulator circuit 9 a speed reference is applied to the operational amplifier 27 to operate the servo motor 29. The servo motor 29 positions the potentiometer 31 according to the speed reference. A feedback from the potentiometer 31 is applied to the operational amplifier 27. The output of the potentiometer 31 is applied to operational amplifier 35. A tachometer feedback from tachometer 33 coupled to the D.C. motor 6 is also applied to the operational amplifier 35. The output from operational amplifier 35 is stabilized by speed loop stabilization circuit 37 and applied to the operational amplifier. The voltage signal from the time lag network 17 and a voltage feedback 45 from the motor current is also applied to the operational amplifier 39.

The stabilizing signal on lines 11 and 13 is applied through a current rate stabilization circuit 51, a current rate limit circuit 49, and a current limit circuit 47, to the operational amplifier 39. The output from the operational amplifier 39 is stabilized by the stabilization circuit 41 to control a firing circuit 43 to fire the rectifier 8.

In summary it has been shown how to obtain a strong signal proportional to the rate of change of the rectifier current at low values of current and proportional to the inductance of the armature circuit for stabilization of a regulator for D.-C. current from a rectifier.

While this invention has been explained and described with the aid of a particular embodiment thereof, it will be understood that the invention is not limited thereby and that many modifications will occur to those skilled in the art. For instance, the stabilizing signal applied in lines 11 and 13 which is proportional to rectifier current, or to the rate of a combination thereof, may also be obtained from the motor terminal voltage or from motor speed, in addition to being obtained from rectifier current. It is therefore contemplated by the appended claims to cover all such modifications as fall within the scope and spirit of the invention.

What is claimed is:

1. A D.-C. power circuit for a load comprising, a rectifier, means for connecting said rectifier to said load, a saturating reactor having a core, means for connecting said saturating reactor between said rectifier and said load to provide an inductance at low current loads, means for sensing the current between said rectifier and the load and for developing a signal proportional to rectifier current therefrom, a regulator for controlling the current from said rectifier to the load, means for applying the signal developed by said sensing means to said regulator to stabilize said regulator, a winding around the core of said saturating reactor adapted to produce a signal at low current flow proportional to the rate of change of rectifier current and the load circuit inductance, and means for applying the signal produced by said winding around the core of said saturating reactor to said regulator to stabilize the regulator.

2. A D.-C. power circuit for the armature circuit of a D.-C. motor comprising, a rectifier, means for connecting said rectifier to the armature circuit of said D.-C. motor, a saturating reactor, means for connecting said saturating reactor between said rectifier and the armature circuit of said D.-C. motor to provide an inductance at low current loads, means for sensing the current between said rectifier and the armature circuit and for developing a signal proportional to rectifier current therefrom, a speed regulator for controlling the D.-C. power from said rectifier to the armature circuit of said D.-C. motor, means for applying the signal developed by said sensing means to said speed regulator to stabilize said speed regulator, a winding around the core of said saturating reactor adapted to produce a signal at low current flow proportional to the rate of change of rectifier current and the load circuit inductance, and means for applying the signal produced by said winding around the core of said saturating reactor to stabilize the said speed regulator.

3. A D.-C. power circuit for the armature circuit of a D.-C. motor comprising, a rectifier, means for connecting said rectifier to the armature circuit of said D.-C. motor, a saturating reactor, means for connecting said saturating reactor between said rectifier and the armature circuit of said D.-C. motor to provide an inductance at low current loads, means for sensing the current between said rectifier and the armature circuit and for developing a signal proportional to rectifier current therefrom, a speed regulator for controlling the D.-C. power from said rectifier to the armature circuit of said D.-C. motor, means for applying the signal developed by said sensing means to said speed regulator to stabilize said speed regulator, a winding around the core of said saturating reactor adapted to produce a signal at low current flow proportional to the rate of change of rectifier current and the load circuit inductance, and time lag means for applying the signal produced by said winding around the core of said saturating reactor to stabilize said speed regulator.

References Cited by the Examiner

UNITED STATES PATENTS

| | | |
|---|---|---|
| 2,419,812 | 4/1947 | Bedford. |
| 3,024,401 | 3/1962 | Dinger _____ 318—345 X |
| 3,096,470 | 7/1963 | Kalian _____ 318—332 |
| 3,181,050 | 4/1965 | Berman _____ 318—513 X |

ORIS L. RADER, *Primary Examiner.*

G. SIMMONS, *Assistant Examiner.*